United States Patent [19]

Suganuma

[11] 4,327,926
[45] May 4, 1982

[54] STEERING LINKAGE FOR VEHICLES
[75] Inventor: Akihiko Suganuma, Nagoya, Japan
[73] Assignee: Toyota Jidosha Kogyo Kabushiki Kaisha, Toyota, Japan
[21] Appl. No.: 130,436
[22] Filed: Mar. 14, 1980
[30] Foreign Application Priority Data Apr. 2, 1979 [JP] Japan .................... 54-43764[U]

[51] Int. Cl.³ .............................................. B62D 7/16
[52] U.S. Cl. ......................... 280/95 R; 74/579 R
[58] Field of Search .................. 74/579 R, 579 F; 280/95 R, 95 A

[56] References Cited
U.S. PATENT DOCUMENTS 1,551,711  9/1925  Toaz ................................ 280/95 R
1,670,954  5/1928  Coleman ........................... 74/579
2,761,694  9/1956  Graham ............................ 280/95 R

*Primary Examiner*—Kenneth Dorner
*Attorney, Agent, or Firm*—Stevens, Davis, Miller & Mosher

[57] ABSTRACT

A steering linkage for vehicles of the type having left and right side knucle arms, a tie rod, a Pitman arm, and a relay rod which pivotably connects the Pitman arm with an intermediate portion of the tie rod and is generally inclined downward from its one end connected with the Pitman arm toward its other end connected with the tie rod, wherein the relative position between the relay rod and the tie rod is so determined that the axis of the relay rod substantially intersects the axis of the tie rod.

1 Claim, 3 Drawing Figures

STEERING LINKAGE FOR VEHICLES

BACKGROUND OF THE INVENTION

The present invention relates to a steering linkage for vehicles, and, more particularly, to a steering linkage for vehicles of the type having rigid axles.

A steering linkage for rigid axle vehicles generally comprises left and right side knuckle arms, a tie rod which pivotably connects said knucle arms with each other, a Pitman arm, and a relay rod which pivotably connects said Pitman arm with said tie rod. In this case, the knucle arms and opposite ends of the tie rod are individually connected with each other by ball joints so that, when one or the two of the left and right side wheels related with the left and right side knucle arms move up and down during running of the vehicle, the knucle arms can pivot vertically around the pivot centers of the ball joint relative to the tie rod as well as other linkage elements substantially stationarily supported by the body of the vehicle. Further, in a conventional steering linkage of this type, the relay rod and the tie rod are also connected with each other by means of a ball joint which is mounted to one side of the tie rod by one of its two mutually pivotable members so that the pivot center of the ball joint is positioned at the same mounting level with the central axis of the tie rod which is generally a straight bar whose central axis is substantially in coincidence with a straight line which connects the pivot centers of the two ball joints connecting the knucle arms with opposite ends of the tie rod. On the other hand, the pivotable connection between the Pitman arm and the relay rod is generally positioned at a higher mounting level than the pivotable connection between the relay rod and the tie rod, and accordingly the relay rod is generally positioned so as to incline downwards from its one end connected with the Pitman arm towards its other end connected with the tie rod. In this case, since the axis of the relay rod does not pass the central axis or the rotary axis of the tie rod, when the relay rod is pushed towards or pulled apart from the tie rod in accordance with turning of the Pitman arm for the purpose of steering, the tie rod is first rotated around its central or rotary axis due to a moment produced by the pushing or pulling force exerted along the axis of the relay rod and the distance of discrepancy between the axes of the relay rod and of the tie rod before the tie rod is shifted in the steering direction along its axis. When this occurs, the initial steering function by rotation of the Pitman arm is cancelled, thereby interferring with normal feeling of the steering system.

SUMMARY OF THE INVENTION

It is therefore an essential object of the present invention to improve a steering linkage of the type mentioned above so as to obviate the aforementioned initial cancelling of the steering action exerted by the Pitman arm.

This object, according to the present invention, is accomplished by arranging a steering linkage of the type mentioned above so that the relative position between the relay rod and the tie rod is so determined that the axes of the relay rod and of the tie rod substantially intersect one another.

Further, in view of the general structure of a steering linkage of the type mentioned above wherein the relay rod is connected with the tie rod by means of a ball joint and the relay rod is positioned so as to incline downward toward its end connected with the tie rod, another object of the present invention is to mount the ball joint which connects the relay rod with the tie rod to the tie rod in such a manner that its pivot center is shifted upward relative to the central axis of the tie rod or, more generally, a straight line which connects the pivot centers of the ball joints connecting the knucle arms with the opposite ends of the tie rod so that the axis of the relay rod or, more generally, a straight line connecting the pivot centers of the ball joint connecting the relay rod with the tie rod and of a ball joint connecting the other end of the relay rod with the Pitman arm substantially intersects the axis of the tie rod or the first mentioned straight line.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
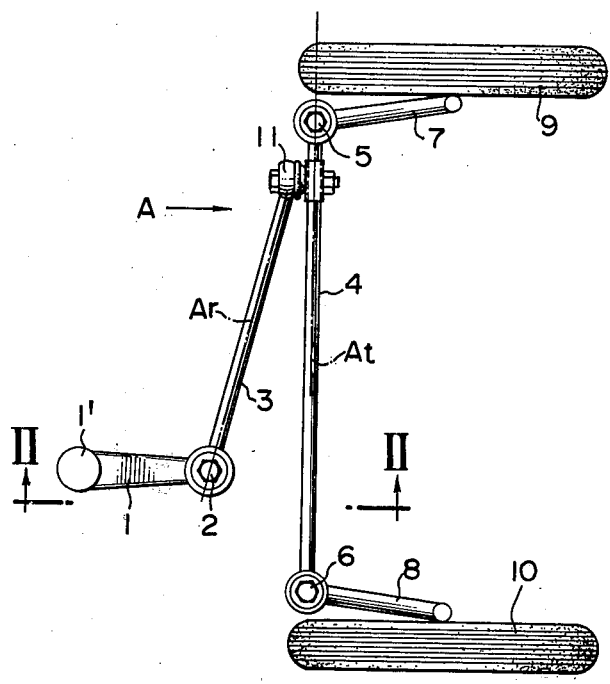
FIG. 1 is a diagrammatical plan view of an embodiment of the steering linkage according to the present invention.
Figure 2:
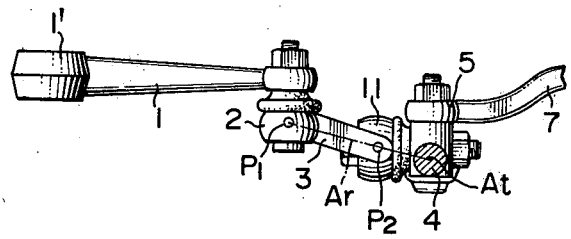
FIG. 2 is a somewhat enlarged cross sectional view along line II—II in FIG. 1; and, FIG. 3 is a somewhat enlarged partial side view seen along arrow A in FIG. 1.
Figure 3:
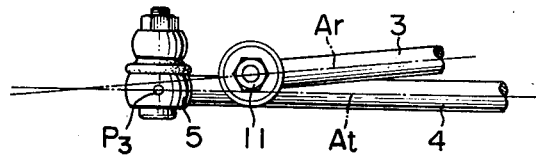

Referring to FIGS. 1-3, 1 designates a Pitman arm supported at its one end 1' by the output shaft of a steering gear which is not shown in the figures but which is well known in the art, wherein the Pitman arm is adapted to turn clockwise or anticlockwise as viewed in FIG. 1 around the center of the end portion 1'. The outer or free end of the Pitman arm supports one of the two mutually pivotable members of a ball joint 2 which itself is well known in the art, the other of said two members of the ball joint 2 being rigidly connected with one end of a relay rod 3 having a central axis designated by Ar.

On the other hand, 4 designates a tie rod having a central axis designated by At, which is pivotably connected at its opposite ends with leftside knucle arm 7 and a rightside knucle arm 8 by means of ball joints 5 and 6, respectively. The knucle arms 7 and 8 act on a leftside wheel 9 and a rightside wheel 10, respectively, so as to change their steering angles.

The other end of the relay rod 3 opposites to its end connected with the Pitman arm is pivotably connected with an intermediate portion of the tie rod 4 by means of a ball joint 11.

As clear from FIGS. 2 and 3, the pivot center P1 of the ball joint 2 connecting the Pitman arm 1 with the relay rod 3 is, as generally so in a steering linkage of this type, positioned at a higher mounting level than the pivot center P2 of the ball joint 11 connecting the relay rod 3 and the tie rod 4. In other words, the relay rod 3 is mounted in the steering linkage so as to incline downward from its end connected with the Pitman arm 1 towrad its other end connected with the tie rod 4.

According to the present invention, in mounting one of the two mutually pivotable members of the ball joint 11 to the tie rod 4, the relative position between the ball joint 11 and the tie rod 4 is so determined that the pivot center P2 of the ball joint 11 is shifted upward relative to the straight line which connects the pivot centers of the ball joints 5 and 6 (the pivot center of the ball joint 5 being shown by P3) so that the straight line which connects the pivot center P1 of the ball joint 2 and the pivot center P2 of the ball joint 11 substantially intersects the first mentioned straight line which connects the pivot centers of the ball joints 5 and 6. In a steering linkage of this type, the tie rod 4 is generally a straight bar member and the straight line which connects the pivot centers of the ball joints 5 and 6 generally coincide with the central axis At of the tie rod 4. Similarly, the relay rod 3 is generally a straight rod member and is generally so adapted that its central axis Ar coincides with the straight line which connects the pivot center P1 of the ball joint 2 and the pivot center P2 of the ball joint 11. Therefore, depending upon these conditions which are generally satisfied in a steering linkage of this type, the concept of the present invention is to arrange the relay rod 3, the tie rod 4 and the ball joint 11 so as to make the central axis Ar of the relay rod 3 intersect the central axis At of the tie rod 4.

As will be apparent to those skilled in the art, when the abovementioned conditions are incorporated in the structure of a steering linkage of this type, the force exerted from the Pitman arm 1 to the tie rod 4 through the relay rod 3 so as to steer the vehicle leftward or rightward generates no moment which would turn the tie rod 4 around its central axis. Therefore, the steering action of the Pitman arm 1 is effectively transmitted to the tie rod 4 so as to drive it leftward or rightward along its axis from the very beginning of turning actuation of the Pitman arm. This, the aforementioned problem of causing cancellation of the effect of turning operation of the Pitman arm in its starting stage due to rotation of the tie rod is effectively avoided.

Although the invention has been shown and described with respect to a preferred embodiment thereof, it should be understood that various changes and omissions of the form and details thereof may be made therein by those skilled in the art without departing from the scope of the invention.

I claim:

1. A steering linkage comprising left and right side knucle arms, a tire rod, a Pitman arm, a relay rod, first and second ball joints which have first and second pivot centers respectively and pivotably connect one ends of said knucle arms respectively with opposite ends of said tie rod so that said knucle arms and said tie rod are pivoted relative to one another around said first and second pivot centers respectively, a third ball joint which has a third pivot center and pivotably connects one end of said Pitman arm with one end of said relay rod so that said Pitman arm and said relay rod are pivoted relative to one another around said third pivot center, and a fourth ball joint which has a fourth pivot center and pivotably connects the other end of said relay rod with an intermediate portion of said tie rod so that said relay rod and said tie rod are pivoted relative to one another around said fourth pivot center, said third pivot center of said third ball joint being positioned at a higher mounting level than said fourth pivot center of said fourth ball joint, characterized in that said fourth ball joint is mounted to said tie rod in such a manner that its said fourth pivot center is at a higher level than a first straight line which connects said first and second pivot centers of said first and second ball joints so that a second straight line which connects said third and fourth pivot centers of said third and fourth ball joints substantially intersects said first straight line.

* * * * *